April 8, 1924.

A. N. PORTER

HOUSING FOR SCREW CONNECTERS

Filed Feb. 27, 1922

1,489,785

INVENTOR
Albert N. Porter
BY
M. E. Gillham
ATTORNEY

Patented Apr. 8, 1924.

1,489,785

UNITED STATES PATENT OFFICE.

ALBERT N. PORTER, OF KANSAS CITY, MISSOURI.

HOUSING FOR SCREW CONNECTERS.

Application filed February 27, 1922. Serial No. 539,300.

*To all whom it may concern:*

Be it known that I, ALBERT N. PORTER, a citizen of the United States, residing at Kansas City, in the county of Jackson and State of Missouri, have invented a new and useful Housing for Screw Connecters, of which the following is a specification.

My invention relates to housings for screw connecters, and the object of the invention is to provide a device of this character for effectually housing threaded pin ends of connecting rods, tools, and the like, to prevent injury and damage to the screw threads during transportation and when not in use.

A further object is to provide a housing of this character which may be used to prevent dirt and other substances from lodgement in the screw threads of pin connecters when the same is not in use and when the same is handled and moved from place to place.

Figure 1:
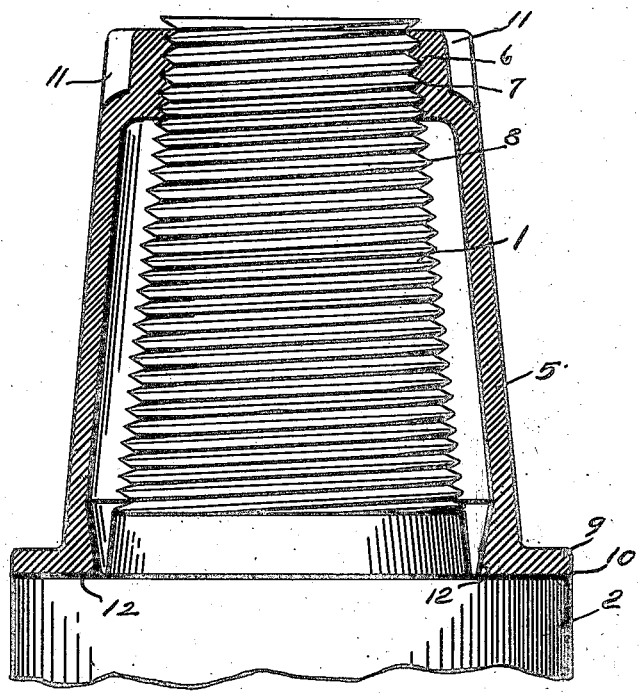
Figure 2:
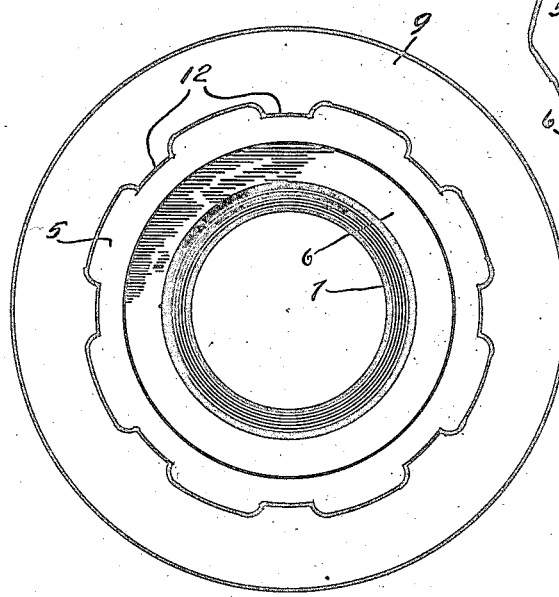
Figure 3:
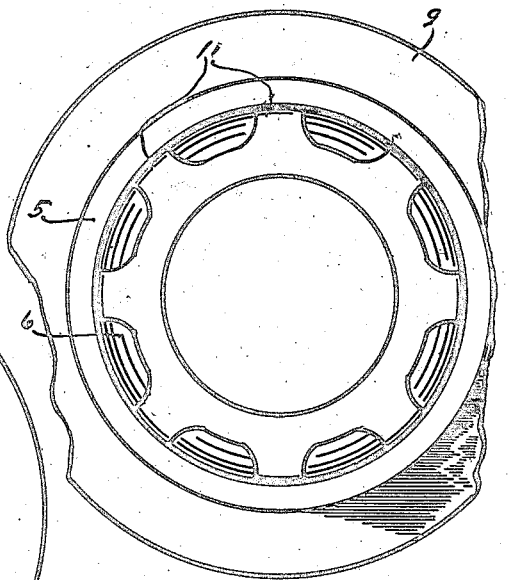

I attain these objects and other advantages by means of the structure and parts illustrated in the accompanying drawing in which—Figure 1, is a vertical section of a housing for screw connecters embodying my invention, and showing the same in operative position to protect the threaded pin end of a drill rod; Figure 2, is a view of the lower end of the housing, and showing the concentric bumpers for impinging upon the shank of the pin when the housing receives shock and, Figure 3, is a view of the upper end of the housing, and showing the radial lugs to facilitate the turning of the housing on and off the threaded pin.

Similar numerals of reference refer to corresponding parts throughout the several views.

The numeral 1, designates the threaded pin end of a drill rod 2, which is very generally used in drilling oil wells, the pin end in this instance being tapered. The housing consists, in this instance, of a hollow tapering metal cylinder 5, preferably made of malleable iron, in the upper or small end of which is an integral head 6, having a concentric opening therethrough vertically of the housing, the wall of the opening being invested with internal screw threads 7, adapted for receiving the screw threads 8, of the threaded pin 1. At the lower or large end of the housing is a peripheral flange 9, which is adapted for seating upon the shoulder 10, on the drill rod when the housing is mounted on the pin. On the periphery of the head portion 6, are a plurality of radially extending lugs 11, which are provided to facilitate the screwing of the housing upon the pin, by hand or wrench, or, by any suitable means, for instance, hammer blows against the lugs in the direction of the desired movement of the housing. On the inner side of the cylinder wall, at the lower or large end thereof, are formed on radial lines, a plurality of concentric formed inwardly tapering bumpers 12, which are specially adapted for impinging upon the shank portion of the threaded pin to prevent lateral movement of the housing to and against the screw threads on the pin whenever shock is received by the housing.

It is my experience that in transporting and using screw connecters with threaded pin ends the screw threads are often damaged by shock incident to their carriage and handling. The housing embodying my invention may be screwed on the pin ends of connecters, thereby preventing injury to the screw threads, the housing receiving the full shock immediately adjusts its position in protection of the screw threads. If the shock is against the side of the housing the latter moves on its seat until the bumpers 12, impinge upon the shank of the pin, thus preventing the housing from striking the screw threads and, also, preventing the locking of the head 6, with the screw threads on the pin. Moreover, the housing in operative position keeps dirt from lodgement in the screw threads of the pin.

When shipping tools and connecter rods having screw threaded pin ends, the housing is screwed down onto the pin until the flange 9, is fairly seated upon the shoulder 10, of the rod, whereupon, the bumpers 12, will be positioned closely adjacent the shank of the pin, so that if the housing receives a shock during transport it will yield sufficiently to bring the bumpers to bear against the shank of the threaded pin and, thereby, save the screw threads from injury, the movement of the housing being limited to substantially the play in the threads in the head, hence the engaging threads will not be jammed and locked. When screwing the housing on the pin, lugs 11, serve to provide means for gripping the housing and turning the same by hand. They also serve to provide opportunity for tapping the lugs to turn the housing by hammer blows, as well as opportunity for the use of an appropriate wrench. When the connecter is used in practice, for instance in drilling oil wells, after using the connecter the housing may be screwed on the threaded pin end and the rod stored on the field without danger of injuring the screw threads by shock or dirt.

Having described my invention what I claim is—

1. A protective housing for screw threads, consisting of a hollow tubular body having an annular flange at one end, an annular series of radial bumper projections on the inner wall of said tubular body in the plane of the flange thereon, a head formed in the opposite end of said tubular body and having an opening therein provided with internal screw threads, and an annular series of radial lugs on the outer side of said head.

2. A protective housing, comprising a hollow tubular body provided with an internally-threaded head at one end and a circular series of internal projections at the other end, and a circular flange projecting outward from the housing opposite the series of projections thereof.

3. A protective housing of frusto-conical form, the interior of the housing being of reduced diameter at each end to form a head at the small end, an internal abutment at the large end, and an interposed chamber between said ends, the wall at the head end being interiorly threaded and provided exteriorly with lugs; the large end of the housing having an external circular flange.

Dated Tulsa, Oklahoma, February 16th, 1922.

ALBERT N. PORTER.

Witnesses:
ELIAS BERELL,
DWIGHT M. SMITH.